(12) United States Patent
Okamoto et al.

(10) Patent No.: US 7,888,900 B2
(45) Date of Patent: Feb. 15, 2011

(54) APPARATUS AND METHOD FOR ROBOT HANDLING CONTROL

(75) Inventors: Shusasku Okamoto, Kanagawa (JP); Masamichi Nakagawa, Osaka (JP); Yasunao Okazaki, Shiga (JP); Takashi Anezaki, Osaka (JP); Tamao Okamoto, Hyogo (JP)

(73) Assignee: Panasonic Corporation, Osaka (JP)

( * ) Notice: Subject to any disclaimer, the term of this patent is extended or adjusted under 35 U.S.C. 154(b) by 206 days.

(21) Appl. No.: 12/233,079

(22) Filed: Sep. 18, 2008

(65) Prior Publication Data
US 2009/0018700 A1  Jan. 15, 2009

Related U.S. Application Data

(62) Division of application No. 10/694,116, filed on Oct. 27, 2003, now Pat. No. 7,443,115.

(30) Foreign Application Priority Data

Oct. 29, 2002  (JP)  ............................. 2002-313915

(51) Int. Cl.
G05B 19/04  (2006.01)

(52) U.S. Cl. ................. 318/568.21; 318/568.2; 318/568.11; 318/567; 318/563; 318/565; 700/260; 700/245

(58) Field of Classification Search ............ 318/568.21, 318/568.2, 568.1, 567, 563, 565; 700/260, 700/245
See application file for complete search history.

(56) References Cited

U.S. PATENT DOCUMENTS 3,904,234 A   9/1975  Hill et al.
4,605,354 A * 8/1986  Daly .......................... 414/730
4,637,736 A   1/1987  Andeen et al.
5,200,679 A   4/1993  Graham
5,226,779 A * 7/1993  Yeakley .................... 414/753.1
5,513,106 A * 4/1996  Yoshino et al. ............... 701/23

(Continued)

FOREIGN PATENT DOCUMENTS

JP  04-189484 A  7/1992

(Continued)

OTHER PUBLICATIONS

T. Wosch, et al., "Reactive Motion Control for Human-Robot Tactile Interaction", Proceedings of the 2002 International Conference on Robotics Automation, vol. 4, pp. 3807-3811, May 2002.

(Continued)

*Primary Examiner*—Bentsu Ro
*Assistant Examiner*—David S Luo
(74) *Attorney, Agent, or Firm*—RatnerPrestia

(57) ABSTRACT

A robot arm is provided with an end effecter for grasping an object and a force sensor for detecting a force acted upon the end effecter. In the state in which end effecter grasps an object, when there is a change in the force acting on the end effecter detected by the force sensor, outputted is a signal for releasing the force of the end effecter grasping the object. The object grasped by the end effecter can be taken out as if the object were handed from person over to person.

12 Claims, 9 Drawing Sheets

U.S. PATENT DOCUMENTS 5,796,229 A * 8/1998 Akeel .................... 318/563
5,847,529 A   12/1998 Chao et al.
6,692,049 B2 * 2/2004 Holbrooks ............... 294/103.1
6,865,446 B2 * 3/2005 Yokono et al. .............. 700/245

FOREIGN PATENT DOCUMENTS

| JP | 06-344283 A | 12/1994 |
|---|---|---|
| JP | 09-245078 A | 9/1997 |
| JP | 10-100089 | 4/1998 |

OTHER PUBLICATIONS

I. Kim, et al., "Control of a Robot Hand Emulating Human's Hand-Over Motion", Mechatronics, Pergamon Press, vol. 12, No. 1, pp. 55-69, Feb. 2002.

European Search Report corresponding to Application No. EP 03 02 4756 dated Jun. 23, 2004.

* cited by examiner

FIG.3

| TIME | FORCE SENSOR VALUE | JOINT-ANGLE SENSOR VALUE |
|---|---|---|
| t(n) | P(n) | D(n) |
| ⋮ | ⋮ | ⋮ |
| t(1) | P(1) | D(1) |
| t(0) | P(0) | D(0) |

APPARATUS AND METHOD FOR ROBOT HANDLING CONTROL

This is a Divisional application based on application Ser. No. 10/694,116 filed Oct. 27, 2003, the entire disclosure of which is incorporated herein by reference.

FIELD OF THE INVENTION

This invention relates to an apparatus and method for robot handling control that, when a force is externally applied to an object being grasped by the robot, typically in the case an object-of-grasp is to be taken out by the force of a person, recognition is made on the fact thereof so that a grasp force of the robot grasp means can be placed under control in a manner releasing the robot grasp means.

BACKGROUND OF THE INVENTION

Today, it is utilized in quite various fields to make a robot grasp an object and perform any working operation, e.g. grasping and transporting parts on the auto product assembling line in the factory, and transporting/controlling inventories in the automated warehouse. There are examples in the limitless number.

For such an industrial robot, one of the important technologies sought for grasping lies in an art for placing the grasp force under control in order to prevent the object being grasped from falling down. For example, JP-A-4-189484 describes a structure having an end effecter provided, at its finger end, with a sensor for detecting a slide of the grasped object wherein, when a slide of the object of grasping is detected by the sensor, finger grasp force is increased a predetermined amount by a grasp-force control apparatus, thereby enabling to positively grasp the grasped object without falling by a minimum grasp force.

The prior-art grasp control technologies as in the above are mainly for industrial applications. These are the arts necessitated for correctly performing the operations to grasp and move an object and then release it, in accordance with a previously determined program.

Meanwhile, recently, humanoid-type robots have been developed vigorously toward the goal of assisting human life while coexisting with mankind. The humanoid-type robot has one of the major developmental objects to explore the possibility of coexistence with mankind. This is one of the significant differences from the traditional industrial robots.

The coexistence with mankind inevitably requires the realization of interaction with a person. This necessitates the functions to be realized in a hardware fashion in addition to the functions realizable on software, such as personal recognition and speech dialogue. The hardware-like interaction function includes those of functions to shake hands and exchange a grasped object with a person.

However, there is a difficulty in applying, as an example of robot-human interaction, the technology described in JP-A-4-189484 to the grasp-force control of an end effecter for delivering an object being grasped by the robot over to a person. This is because, in case the person is to take out an object being grasped by the robot, the robot is controlled toward the stronger grasping not to be deprived of the grasped object. Accordingly, in some cases, there are possibly problems of breaking the grasped object.

Meanwhile, the conventional humanoid-type has the function to grasp an object. However, concerning the function of delivering a grasped object from the robot over to the person, there has been realized nothing more than a quite simple method not requiring real-time control of grasp-force. For example, adopted is a method that an end effecter imitating the human hand turns its palm up, and the grasp is released so that a grasped object is placed on the palm, allowing a person to take it up, making a state in which the grasped object can be taken up anytime. Thus, there is no hardware-like interaction function with a person.

SUMMARY OF THE INVENTION

It is an object of the present invention to realize placing an end effecter under control as if an object were handed over between persons by carrying out a real-time control on a grasp force upon delivering a grasped object from the robot to a person, as one of the hardware control technologies for realizing to make a real interaction between a person and a robot as if between persons.

Meanwhile, it is another object of the invention to provide an apparatus and method for robot handling control that, in a case an external force is applied to an object being grasped by an end effecter, this external force can be distinguished whether it is a force caused upon taking out the object by a person or a force caused by the other.

An apparatus for robot handling control of the present invention includes an end effecter for grasping an object, a force sensor for detecting a force acting upon the end effecter, and a grasp-force control unit for outputting a signal for releasing a force of the end effecter grasping the object in a case there is a change in the force acting upon the end effecter in a state in which the end effecter grasps the object. When a person takes out an object being grasped by the robot, taking out is possible as if the object were handed over between persons.

BRIEF DESCRIPTION OF THE DRAWINGS

FIG. 3 is a figure showing a memory content according to embodiment 1 of the invention;

DESCRIPTION OF THE EXEMPLARY EMBODIMENT

Exemplary embodiments of the present invention are demonstrated hereinafter with reference to the accompanying drawings.

1. First Exemplary Embodiment

Figure 1:
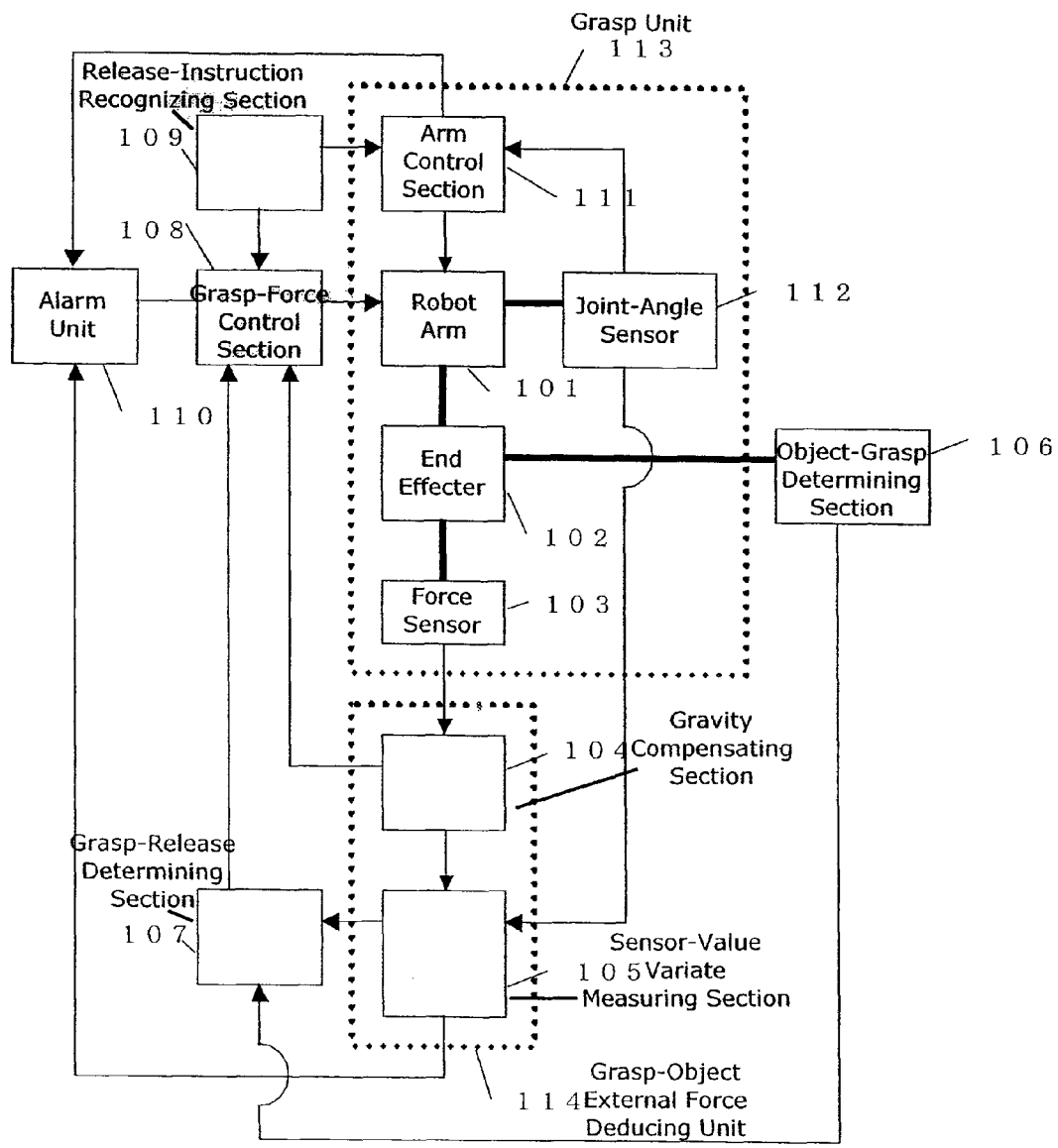
FIG. 1 is a block diagram showing a configuration of an apparatus for robot handling control according to embodiment 1 of the present invention.

FIG. 1 is a block diagram showing a configuration of a robot-grasp control apparatus of the present invention. In FIG. 1, a robot arm 101 is the arm of a robot. An end effecter 102 has a mechanism attached on the robot arm 101 in order to grasp an object. The robot arm 101 is arranged with a joint-angle sensor 112 while the end effecter 102 is arranged with a force sensor 103.

The force sensor 103, a sensor for detecting a force applied thereto, is arranged on the end effecter 102, to detect an external force applied to the end effecter 102. Various kinds of sensors can be used for the force sensor 103. For example, it may use a strain amount detector based on a strain gauge, a torque detector, a sliding-friction detector, or the like.

The joint-angle sensor 112 is for detecting a rotation angle at a joint of the robot arm 101. Typically, it is a detector on absolute angle or relative angle based on an optical rotary encoder. The rotary encoder is constructed with rotary and fixed plates having slits, a light-receiving element, a light-emitting element, and so on. During rotation of the rotary plate, light is allowed to pass through the slits of the rotary and fixed plates so that the pulses thereof can be counted to compute a rotation angle.

A gravity compensating section 104 is for removing from a force detected by the force sensor 103 a gravity component acted upon the grasped object, an inertial force, centrifugal force and Coriolis force caused due to movement of the robot arm 101, and the like. This makes it possible to compute a true external force applied to an object when a person takes out the object.

A sensor-value variate measuring section 105 is for measuring a value on the force sensor 103 or joint angle sensor 112 at a predetermined interval of time.

An object-grasp determining section 106 is for determining whether or not the end effecter 102 is grasping an object. This is arranged at the inner surface of the end effecter 102 so that, when the end effecter 102 grasps an object, the object-grasp determining section 106 can be placed in contact with the object. The object-grasp determining section 106 uses, for example, a pressure-perceiving sensor for measuring a contact-pressure distribution on the contact surface between the end effecter 102 and the object, or an optical sensor provided on the inner surface of the end effecter 102. The optical sensor can be constituted by the use of one set or a plurality of sets of light-emitting elements having infrared LEDs as light sources and light-receiving elements such as photodiodes.

Note that, even in the case of using any type of sensor as the object-grasp determining section 106, attention should be naturally paid not to cause interference in its arrangement with the force sensor 103.

Figure 4A:
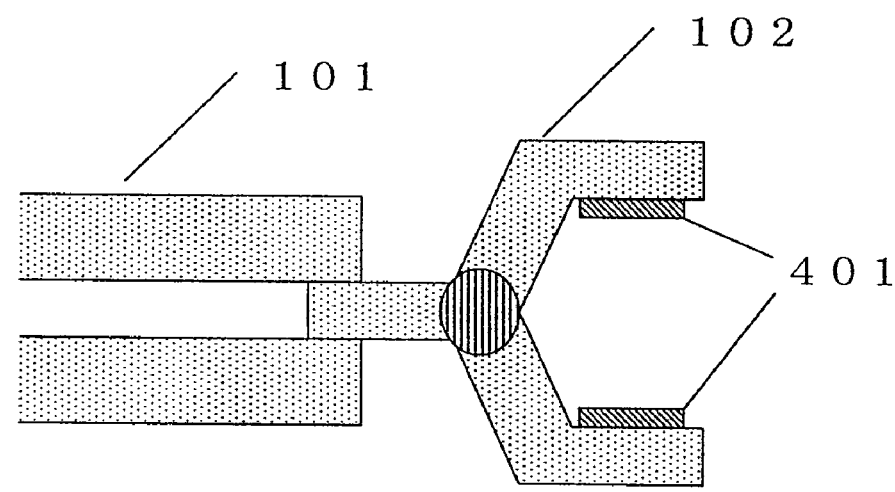
FIGS. 4A and 4B are each a sectional plan view showing a sensor structure arranged on an end effecter according to embodiment 1 of the invention.
Figure 4B:
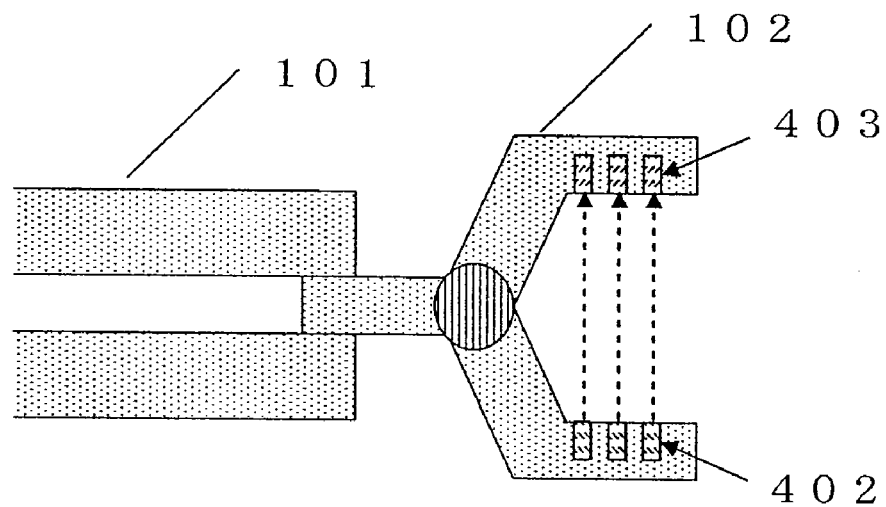

FIG. 4A is a figure showing pressure-perceiving sensors 401 arranged on the both inner surfaces of the end effecter 102. FIG. 4B is a figure that three sets of light-emitting elements 402 and light-receiving elements 403 are arranged as optical sensors in the inner surfaces of the end effecter 102. Note that the pressure-perceptive sensors 401 in FIG. 4A may be arranged in one surface.

A grasp-release determining section 107 determines whether the grasp force of the end effecter 102 should be weaken or not, from the two statuses, i.e. a presence or absence of information about a sensor-value change due to the force sensor 103 in a measurement result in the sensor-value variate measuring section 105, and a presence or absence of grasping an object by the end effecter 102 in the object-grasp determining section 106. In the case of weakening it, the grasp-release determining section 107 forwards a signal for releasing the grasp force to a grasp-force control section 108 hereinafter explained.

The grasp-force control section 108 receives signals from the grasp-release determining section 107, gravity compensating section 104 and the release-instruction recognizing section 109, and outputs a signal for controlling the grasp force of the end effecter 102 in accordance with the contents of these signals.

A release-instruction recognizing section 109, for recognizing an external instruction for releasing the end effecter 102, uses a mike and a speech recognition program, for example. Namely, in case a person gives an utterance having a content for releasing the end effecter 102, e.g. "Release Hand" or so to the mike set up on the robot, the speech recognition program analyzes the meaning of text and determines that the speaking person requests to release the end effecter 102. The release-instruction signal for releasing the same is sent to the arm control section 111, hereinafter referred, and the grasp-force control section 108.

Incidentally, determining a release instruction may be by an arrangement, for example, of a physical switch for releasing the end effecter 102 on the robot, instead of the mike and the speech recognition program.

When recognizing that there is an external request for releasing the end effecter 102, the release-instruction recognizing section 109 decreases a feedback gain value for controlling a finder position of the robot arm 101. This can make a process to reduce the rigidity at the joints of the robot arm 101. Thereafter, the information notifying the same fact is sent to the alarm unit 110.

The alarm unit 110 issues an alarm prompting the external to call an attention, in the case that the grasp-force control section 108 is to release the end effecter 102 or the sensor-value variate measuring section 105 has measured a variate exceeding a threshold of the joint-angle sensor 112. The alarm may be changed in content depending upon the situation. The alarm uses audible means such as sound or voice, visible means such as LED flashing, or means hybridizing those.

The arm control section 111 receives a feedback signal of joint angle from the joint-angle sensor 112, and provides a command to an actuator, such as a motor, for driving the joints of the robot arm 101. This places under control the position of the end effecter 102 attached on the robot arm 101 as well as the force to be applied to the robot arm 101.

The grasp unit 113 structurally includes the robot arm 101, the end effecter 102, the joint-angle sensor 112, the force sensor 103 and the arm control section 111, to detect an external force acted on the mechanism of grasping an object and a grasped object. In the case to grasp an object, when controlling the grip unit 113, the robot arm 101 is placed under control to guide the end effecter 102 to a position for grasping the object and then the end effecter 102 grasps the object, similarly to human motion.

A grasp-object external force deducing unit 114 structurally includes gravity compensating part 104 and sensor-value variate measuring means 105. In the case there is a change in the force acting upon the object being held by the grasp unit 113, the grasp-object external force deducing unit 114 deduces a factor which caused the force change. In a deduction by the grasp-object external force deducing unit 114, when an external force acts upon an object grasped by the end effecter 102, the external force is distinguished whether it is a force caused upon being taken out by a person or a force resulting from the other cause.

Figure 2:
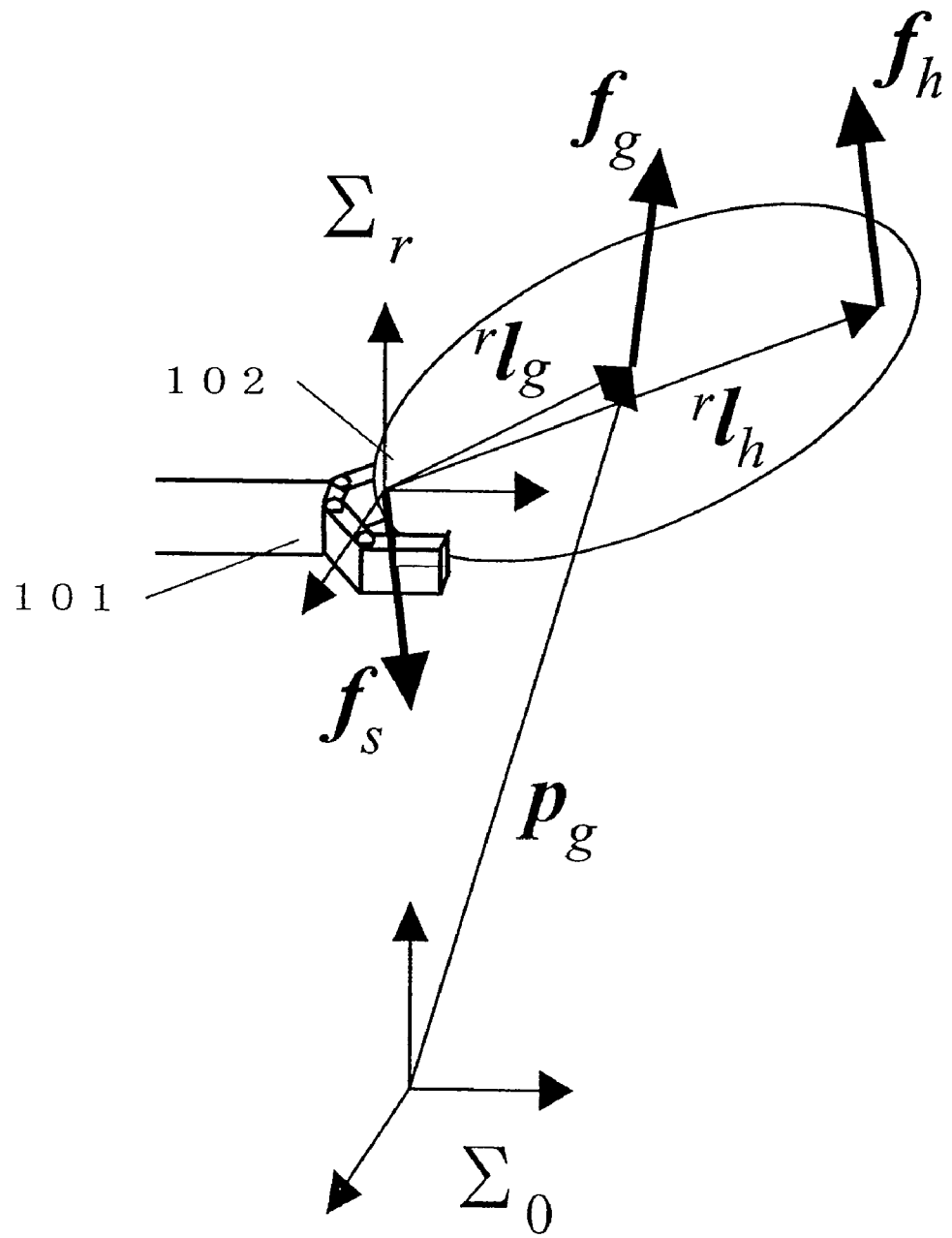
FIG. 2 is a concept figure showing a method of computing an external force to be applied to an object by gravity compensating means according to embodiment 1 of the invention.

FIG. 2 is a figure showing a method for the gravity compensating section 104 to compute an external force to be applied to an object. The equation for computation can be derived as in the following.

Provided herein, as shown in FIG. 2, that $\Sigma_0$ is the reference coordinate system, $\Sigma_r$ is the coordinate system fixed at the finger of the robot arm 101, $f_s$ as a six-dimensional vector is the detection value of the force sensor 103 (force applied by the object to the finger of the robot arm 101), $f_h$ as a six-dimensional vector is the force applied by a person to the object, $f_g$ as a six-dimensional vector is the resultant force of $f_s$ and $f_h$ at an object center of gravity, then the equation of motion for the object can be expressed by Equation 1.

$$M\dot{v}+h=f_g \quad \text{Equation 1}$$

Herein, M, V and h in Equation 1 are expressed respectively by Equations 2, 3 and 5 while $T_g$ in Equation 3 is by Equation 4.

$$M = \begin{bmatrix} mE_3 & O_3 \\ O_3 & I \end{bmatrix} \quad \text{Equation 2}$$

$$v = \begin{bmatrix} \dot{p}_g^T & \omega^T \end{bmatrix}^T = T_g J \dot{q} \quad \text{Equation 3}$$

$$T_g = \begin{bmatrix} E_3 & -[^0R_r{}^rl_g \times] \\ O_3 & E_3 \end{bmatrix} \quad \text{Equation 4}$$

$$h = \begin{bmatrix} m[0 \; 0 \; -g]^T \\ \omega \times I\omega \end{bmatrix} \quad \text{Equation 5}$$

In Equations 1 to 5, m is the mass of the object, I is the inertial tensor at a center-of-gravity point of the object, $p_g$ is the center-of-gravity position of the object, $\omega$ is the angular velocity about the center of gravity of the object, q is the joint variable vector of the robot arm 101, J is the Jacobian matrix on the robot arm 101, $R_r$ is the rotation matrix of from $\Sigma_0$ to $\Sigma_r$, $^rl_g$ is the center-of-gravity position as seen from $\Sigma_r$, and g is the acceleration of gravity.

Meanwhile, concerning the force acting upon the object, a balance equation in Equation 6 is held. Herein, $T_g$ is expressed by Equation 7 wherein $^rl_h$ is the position of a point of application of the external force as seen from $\Sigma_r$.

$$f_s = T_g^T f_g + T_h^T f_h \quad \text{Equation 6}$$

$$T_h = \begin{bmatrix} E_3 & -[^0R_r{}^rl_h \times] \\ O_3 & E_3 \end{bmatrix} \quad \text{Equation 7}$$

From the above equation of motion and the computation equation of force balance, it is possible to express by Equation 8 a component F of an external force removed of a gravity, an inertial force, a centrifugal force and a Coriolis force from a detection value of the force sensor 103.

$$F = T_h^T f_h = f_s - T_g^T f_g \quad \text{Equation 8}$$

In the distinguishing process to be made in the grasp-object external force deducing unit 114, i.e. process of distinguishing whether an external force acted upon an object grasped by the end effecter 102 is a force caused in taking away the object by a person or a force resulting from the other cause, there is one method to effect it by the use of a computation result in the gravity compensating section 104.

Namely, in the case that the compensated value by the above computation equations in the gravity compensating section 104 nearly agrees with the direction of gravity, the grasped object is ready to be falling. Accordingly, it is determined that a frictional force agreeing with the direction of gravity has acted upon. The end effecter 102 is halted from being released, to output a signal for increasing the grasp force to the grasp-release determining section 107.

Meanwhile, the other force is detected, it is determined that a person has grasped, to output a signal for releasing the end effecter 102 to the grasp-release determining section 107.

The sensor-value variate measuring section 105 makes a measurement on values of the force sensor 103 and joint-angle sensor 112 at a predetermined interval of time. Concerning the force sensor 103, inputted is a value of force removed, by the gravity compensating section 104, of a gravity, inertial force and Coriolis force applied to the grasped object.

Herein, the end effecter 102 of this embodiment is placed under control depending upon a change amount in value of the force sensor 103 or joint-angle sensor 112. However, in case a sensor value variate is computed only with a difference in minimum unit time of process, when the force externally applied to the object grasped by the end effecter 102 is strengthened quite slowly, the change in value of the force sensor 103 is excessively small. Thus, there is possibly a case that grasp release is not placed under control. For this reason, in this embodiment, the input values from the force sensor 103 are stored, retroactively to a predetermined past time, together with time data to a memory.

FIG. 3 shows time-based values of the force sensor 103 and joint-angle sensor 112 stored in the memory, in a table form, wherein t is time and t(0) is the present time. P is a value in time of the force sensor while D is a value of the joint-angle sensor 112. Meanwhile, as the number in the parentheses increases, time is further retroactive to the past. In case sensor values are stored retroactively to the past, even when the force applied to the object grasped by the end effecter 102 is strengthened quite slowly, it is possible to compute a change amount between a force value at the present time and a force value obtained retroactively to the past. Due to this, grasp release can be placed under control.

In this manner, in the case of detecting within a predetermined time a value exceeding an allowable amount in sensor value change independently set on the force sensor 103 and joint angle sensor 112, it is possible to send the grasp-release determining section 107 and alarm unit 110, hereinafter explained, with information about in which sensor the value change has occurred.

Now, explanation is made in detail on the grasp control process of the end effecter 102 according to the robot grasp control apparatus configured as in the above.

In grasp control based on the end effecter of this embodiment, the force sensor 103 is arranged at a joint of the robot arm 101 or the like so that the force sensor 103 can detect a force externally applied to a grasped object. When the grasped object is released, determination is made as to whether the external force is by a person or not, from an extracted value change of the force sensor 103.

At first, explanation is made on a method by which, in the case of releasing the end effecter grasp force by an external force to thereby release the grasped object, determination is made, from a moving state of the object, as to whether the external force is caused by a person or not.

Figure 5A:
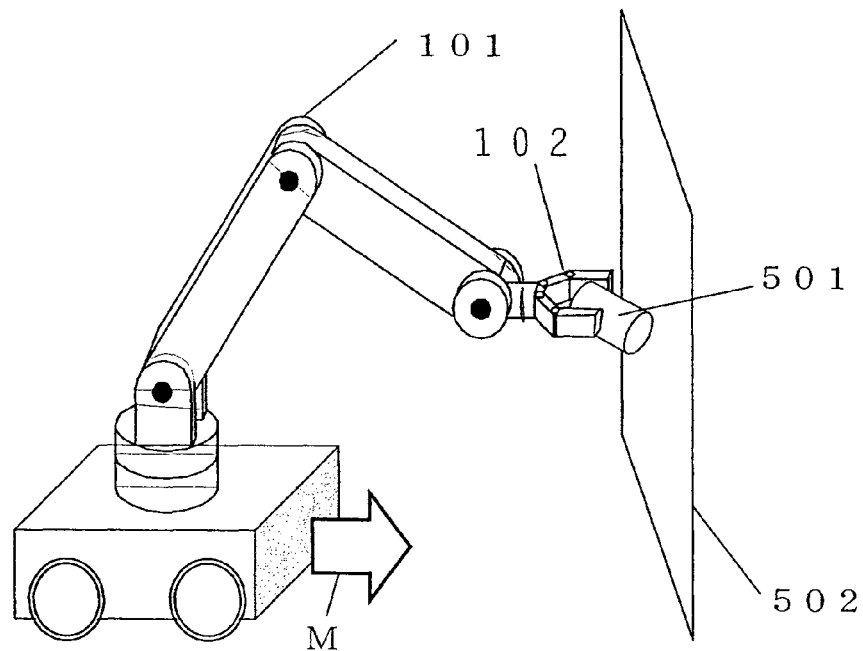
FIG. 5A is a perspective view showing a state that contacted with a wall is the robot-grasp control apparatus grasping an object according to embodiment 1 of the invention.
Figure 5B:
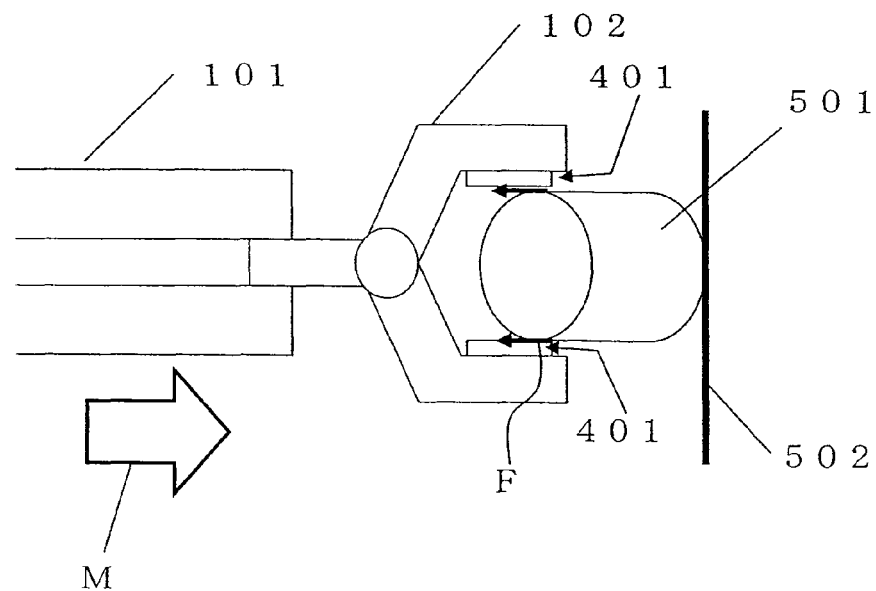
FIG. 5B is a fragmentary plan view of FIG. 5A.

FIGS. 5A and 5B shows a case of detecting a value change of the force sensor 103 in the other situation than that in which the grasped object is taken out by a person. FIG. 5A shows a state in which a robot grasping a columned object 501 in its end effecter 102 moves toward a wall 502 and the object 501 is in contact with the wall 502. FIG. 5B is a plan view of the end effecter of FIG. 5A as viewed from the above.

As can be understood from FIGS. 5A and 5B, the robot arm 101 in the entire moves in a direction of arrow M toward the wall 502 whereas the object 501 is in abutment against the wall 502. Consequently, a pressure-perceiving sensor 401 as a force sensor 103 arranged in the end effecter 102 detects an external force F undergone from the wall 502 due to hitting of the object 501 on the wall 502.

From the force F undergone from the wall F, determination is made as to whether the external force F is by a person or not, depending upon a result of measurement on how the object 501 departs from the end effecter 102 when releasing the object 501 from the end effecter 102. Namely, utilized is the physical phenomenon that, in case the external force F is not by a person, the object 501 is liable to fall under gravity as the grasp force of the end effecter 102 is relaxed furthermore.

Figure 6:
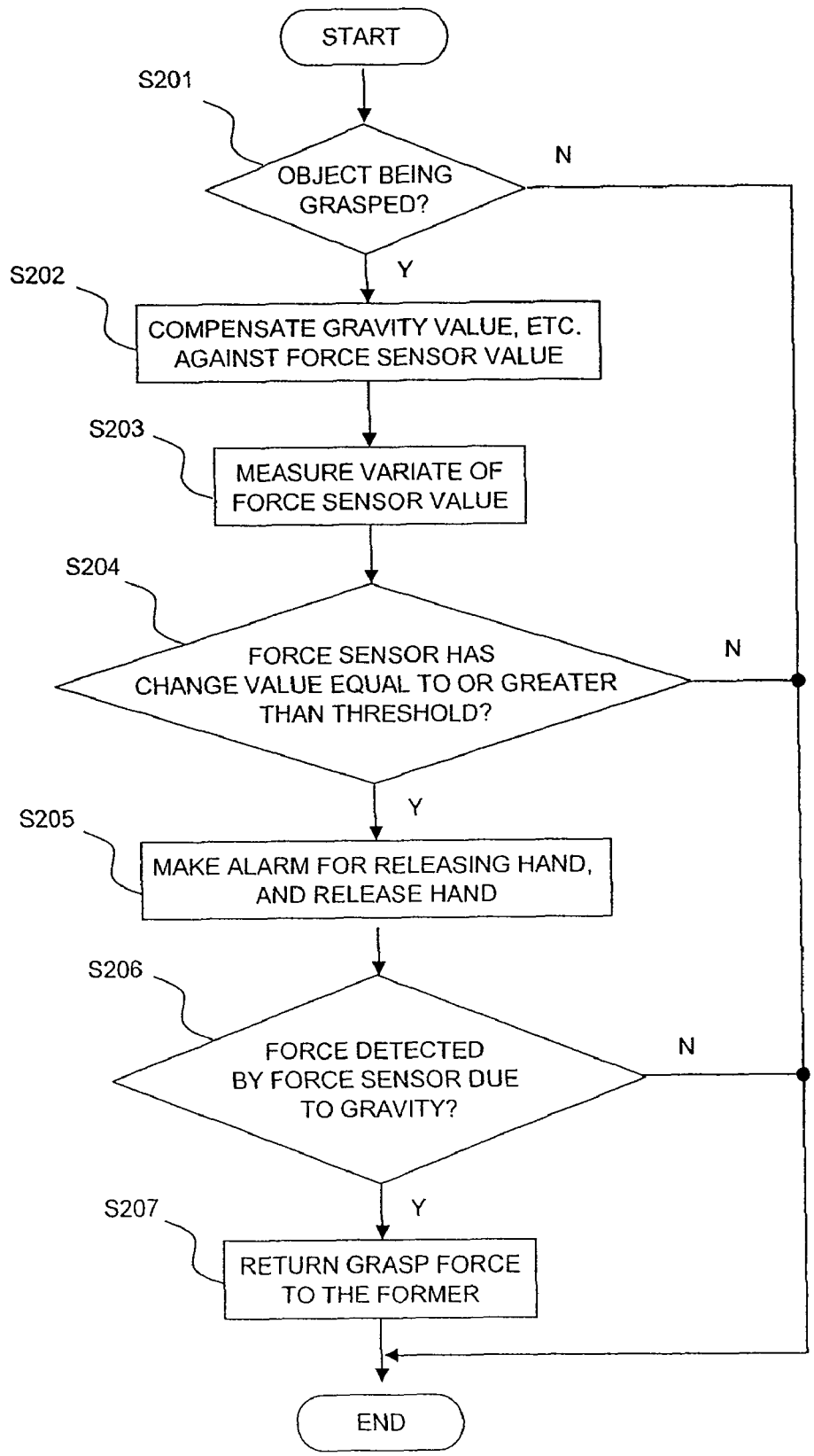
FIG. 6 is a flowchart explaining the grasp operation of the end effecter of the robot-grasp control apparatus according to embodiment 1 of the invention.

FIG. 6 is a flowchart showing a grasp control process of the end effecter 102 using an object moving state, according to the present embodiment.

At S201, the object-grasp determining section 106 determines a presence or absence of grasping an object 501 in the end effecter 102. In case the end effecter 102 is not grasping an object 501, there is no need to release the end effecter 102 and accordingly the process is ended immediately. Meanwhile, when the end effecter 102 is grasping the object, the process proceeds to a process of S202.

At S202, the external force, such as gravity, an inertial force, and Coriolis force, applied to the object 501 is removed depending upon the data, such as a mass, of the object 501 by the gravity compensating means 104. The force sensor 103 sends only a force component F, which is externally applied by a person or so, to the sensor-value variate measuring section 105.

Next, at S203, the sensor-value variate measuring section 105 writes the sent value of the force sensor 103 together with a time to the memory, as shown in FIG. 3.

At S204, reference is made to the memory, to examine a minimum value of the force sensor 103 values from the present time over to a predetermined past. In the case that the change value between the minimum value and the present value is equal to or greater than a predetermined threshold, the information about a change present in the values of force sensor 103 is sent to the grasp-release determining section 107. When the change amount is equal to or smaller than the threshold, there is no need to release the end effecter 102 and accordingly the process is immediately ended.

At S205, receiving the information there is a change in the values of force sensor 103 from the sensor-value variate measuring section 105, the grasp-release determining section 107 forwards a grasp-force releasing signal, a signal instructing to release the grasp force, to the grasp-force control section 108. Receiving the signal for releasing the grasp force, the grasp-force control section 108 first sends the alarm unit 110 with a signal to make an alarm. Receiving this, the alarm unit 110 issues an alarm, e.g. "Release Hand", by the use of a voice or character display. Subsequently, released is the grasp force of the end effecter 102.

Next, at S206, in case the robot force sensor 103 detects a force F, the end effecter 102 is started releasing. Thereupon, weakened is the frictional force resulting from the contact between the object grasped by the end effecter 102 and the end effecter 102. In case the grasp force is continued to be weakened as it is, the gravity acting upon the object 501 exceeds the frictional force at a time point that the grasp force is weakened to a certain degree. The object 501 is about to slide on the end effecter 102 to be fallen vertically. In this state, i.e. in the case that the grasp force of the end effecter 102 is started to be weakened and thereafter the force sensor 103 further detects a downward force, the force applied to the object 501 is determined due to the gravity and the process moves to S207. In the other cases, the process is ended.

At S207, the grasp-force control section 108 outputs to the end effecter 102 a grasp-force strengthening signal for increasing the strength to prevent the object 501 from falling.

As in the above, the end effecter 102 can be placed under control by the use of the object 501 in a moving state.

Now, explanation is made on a discriminating process to be carried out in the grasp-object external force deducing unit 114, i.e. process of discriminating whether an external force applied to the object 501 grasped by the robot is a force caused to take out the object 501 by a person or a force resulting from the other.

At first, when the robot force sensor 103 detects an external force F, a force in the opposite direction to the external force F is somewhat applied. In the case of detecting a reactive force to that force, the external force is determined to be caused by a person. In this case, processing is made to follow a natural action in handing an object over between persons. Namely, when a person in a blind state is to deliver an object, typically he or she once lightly draws it back and makes sure that the opposite person is positively grasping the object on the basis of a presence or absence of a reactive force to that. The robot is made to perform the same process as this. Herein, the opposite directional force is not necessarily quite opposite in direction but may be a force having a component in the opposite direction.

Figure 7:
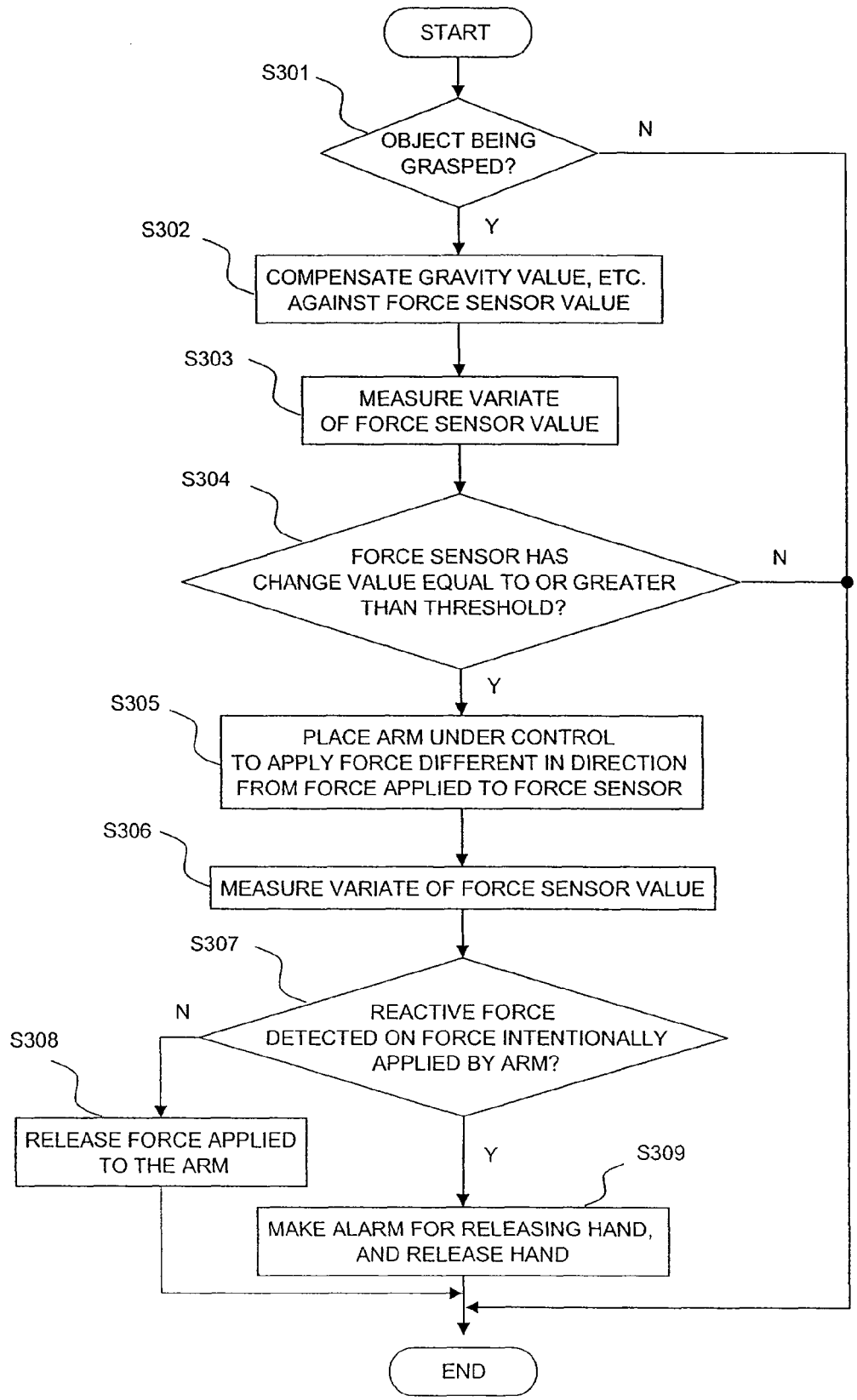
FIG. 7 is a flowchart explaining the grasp operation of the end effecter, in the case of using an external reactive force, of the robot-grasp control apparatus according to embodiment 1 of the invention.

FIG. 7 is a flowchart showing a process flow in the robot-grasp control apparatus using an external reactive force, according to the present embodiment. The processes of from S301 to S304 as similar to the processes of S201 to S204 of the FIG. 6 flowchart, and hence omitted of explanation.

At step S305, in case the robot force sensor 103 detects an external reactive force in the process of S304, the robot arm 101 is placed under control in a manner of applying a different force from the force F received at the force sensor 103. Herein, the different force uses typically a reactive force opposite in direction to a force received. The opposite direction is not necessarily perfectly opposite in direction.

At S306, computation is made for the process of S305 by the gravity compensating means 104 as to whether or not the force sensor 103 detects a reactive force to the force F applied to the robot arm 101.

At S307, in case detected at S306 is a reactive force to the force intentionally applied by the robot arm 101, it is determined that the object 501 being grasped by the end effecter 102 is about to be grasped from the external, and the process moves to S309. Meanwhile, when a reactive force is not detected in S307, immediately removed at S308 is the force intentionally applied in the process of S306 by the robot arm 101, to end the process.

At S309, the gravity compensating section 104 forwards a signal for relaxing the grasp force to the grasp-force control section 108. The grasp-force control section 108, upon receiving the signal, first sends the alarm unit 110 with a signal to make an alarm. Receiving this, the alarm unit 110 issues an alarm, e.g. "Release Hand", by the use of a voice or character display. Subsequently, released is the grasp force of the end effecter 102, to end the process.

When the robot is actually operating, the FIGS. 6 and 7 flowcharts are not satisfactorily processed once but always processed at a predetermined unit time interval. This is because it is unknown for the robot at what time point the grasped object 501 is taken out. The unit time may be determined depending upon a situation because it relies upon the situation in which the robot introduced with the present process is to be used. For example, for a robot made for communications with the human being, if it is assumed that the object held by the robot be taken out by a person, the unit time should apparently be given shorter than a time required for a person to grasp and begin pulling the object.

As in the above, when the end effecter 102 grasps the object 501 to thereby cause a change in the force acting upon the end effecter 102 detected by the force sensor 103, the end effecter 102 releases the grasp force according to a grasp-force releasing signal outputted from the grasp-force control section 108. Thereafter, in case the force sensor 103 detects a dynamic frictional force in the gravity direction caused by a fall movement of the object 501, the grasp force is strengthened.

On the other hand, when the force acting on the end effecter 102 is changed, the robot arm 101 including a plurality of joints and attached with the end effecter 102 applies a force in at least one direction different from the direction the force is acting. After the robot arm 101 moves at least in one direction, and when the force sensor 103 detects a reactive force, the end effecter 102 determines that a person is about to grasp and take out the grasped object 501, thus causing operation of releasing the grasp force. Accordingly, when a person is about to grasp and take out the object 501 grasped by the end effecter 102, such handling of the person can be understood. It is possible to realize such control of releasing the grasp force as handing a thing from person over to person without strengthening the grasp force into crushing the object in the hand.

As in the above, according to the present embodiment, the robot makes, in a self-controlled fashion, a determination that a person is about to take out an object grasped by the robot. When the object grasped by the end effecter is grasped and taken out by a person, the handling of the person can be understood. It is possible to realize such control of releasing the grasp force as handing a thing from person over to person without strengthening the grasp force into crushing the object in the hand.

Meanwhile, in the case of determining that a person is about to take out the object grasped by the robot, the fact thereof is alarmed. Thus, the object can be taken out without anxiety.

2. Second Exemplary Embodiment

Embodiment 2 sets up a joint angle sensor 112 at the joint of the robot arm 101. In case a person notifies the robot of taking a grasped object out of that, the robot releases the force controlling the robot arm 101 to such an extent as not to be moved by a physical force, such as gravity, but to be freely moved by the application of an external force. When the grasped object is externally pulled out, it is detected that the robot joint has moved following it, thus effecting grasp release. Embodiment 2 is explained in the below by using FIG. 8.

Figure 8:
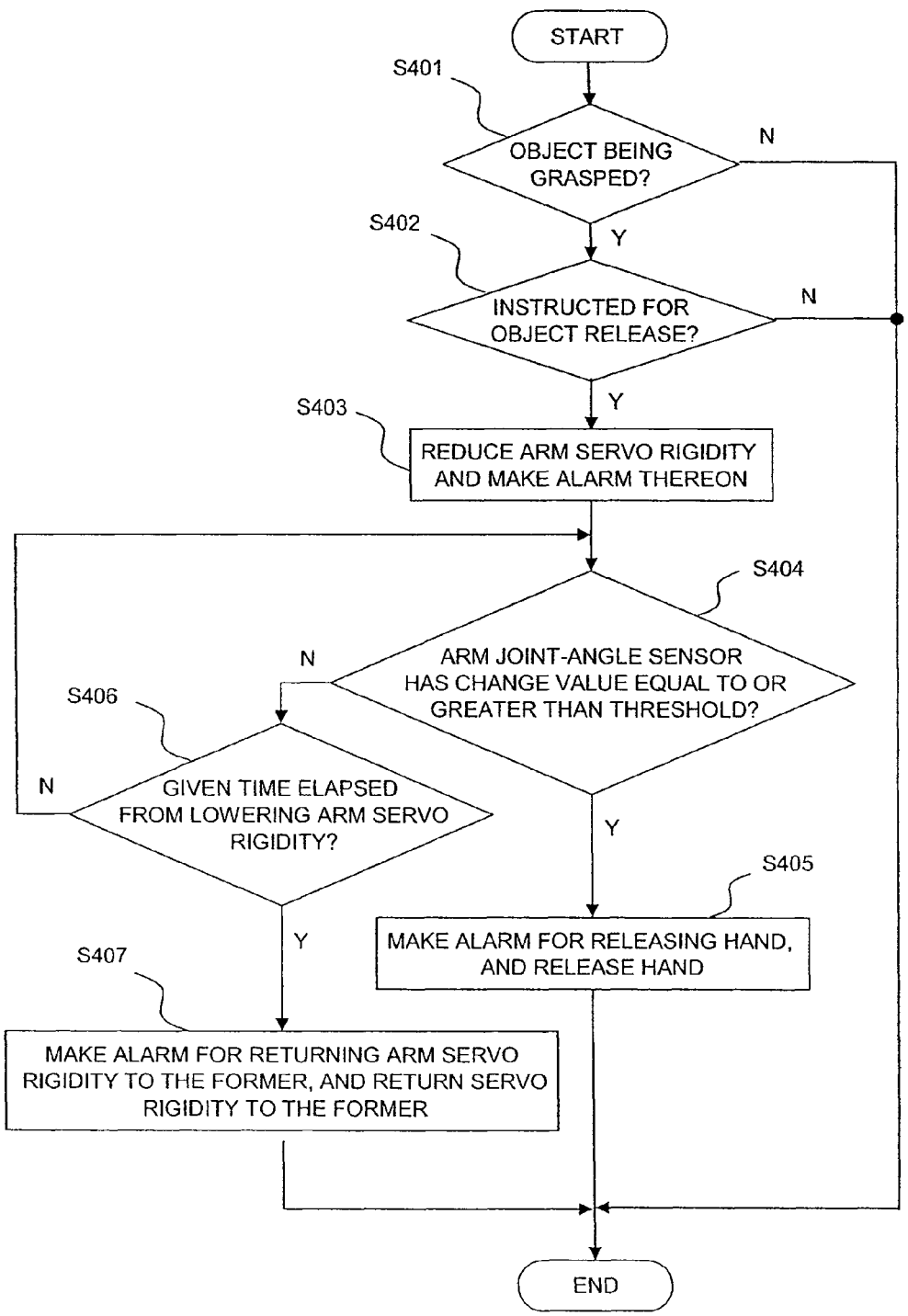
FIG. 8 is a flowchart explaining the grasp operation of the end effecter of the robot-grasp control apparatus according to embodiment 2 of the invention.

FIG. 8 is a flowchart showing a process flow by a robot grasp control apparatus according to embodiment 2.

At S401, the object-grasp determining section 106 determines a presence or absence of grasping an object by the robot. In case an object is not grasped, there is no need for release control of the end effecter 102 and accordingly the process is immediately ended. In case an object is grasped by the end effecter 102, the process proceeds to S402.

At S402, the release-instruction recognizing section 109 determines a presence or absence of an external instruction for releasing the end effecter 102. In case there is an instruction for releasing the end effecter 102, a release-instruction signal is sent to the arm control section 111 and grasp-force control section 108. Meanwhile, in case there is no instruction for releasing the end effecter 102, the process is immediately ended.

At S403, receiving a release-instruction signal from the release-instruction recognizing section 109, the arm control section 111 lowers the rigidity of a servo motor constituting the joint so that the finger of the robot arm 101 can be easily moved when a person takes out the object. The arm control section 111, after lowering the rigidity of the servo motor, sends the alarm unit 110 with the information notifying the fact. The alarm unit 110 receives the information and issues an alarm "Shoulders Released" or the like meaning the weakened rigidity of the robot arm 101 through the use of a voice or character display.

At S404, the sensor-value variate measuring section 105 observes measurement values of the joint-angle sensor 112 whereby, in case detecting a deviation of finger position from a target value, it can be detected that a person has taken out the grasped object. In the case that the joint-angle sensor 112 of the robot arm 101 has a change amount equal to or greater than a threshold, the information of which is sent to the grasp-release determining section 107, and then the process proceeds to S405. In case the change amount is smaller than the threshold at S404, the process proceeds to S406 where a lapse time is seen from lowering in the robot arm servo rigidity at the process of S403, thereby determining whether or not a given time has elapsed. In case a given time has elapsed, the process proceeds to S407, an alarm for returning the robot arm servo rigidity to the former rigidity is made by the alarm unit 110. Subsequently, the robot arm servo rigidity is returned to the state before lowering, and then the process is ended. Unless a given time has elapsed, the process returns to the beginning of S404 to thereby repeat the process.

In the case that the grasp-release determining section 107 at the process of S404 receives the information the joint-angle sensor 112 has a change amount equal to or greater than the threshold, the process proceeds to S405, to forward to the grasp-force control section 108 a grasp-force releasing signal as a signal instructing to release the grasp force. Receiving the signal for releasing the grasp force from the grasp-release determining section 107, the grasp-force control section 108 first sends the alarm unit 110 with a signal for making an alarm. Receiving this, the alarm unit 110 issues an alarm "Release Hand" or the like. Subsequently, the grasp force of the end effecter 102 is released, to end the process.

In embodiment 2, when the robot is actually operating, the process of the FIG. 8 flowchart is not satisfactorily done once but always executed at a unit time interval similarly to embodiment 1.

In embodiment 2, the joint-angle sensor 112 is provided at the joint of the robot arm 101. In case that the robot is informed of taking a grasped object therefrom, the robot releases the force controlling the robot arm 101 to such an extent as not to be moved by a physical force, such as gravity, but to be freely moved by the application of an external force. When the grasped object is externally pulled out, it is detected that the robot joint has moved following it, thus releasing the grasping.

Due to this, in the case that a person is to grasp the object being grasped in the end effecter 102 of the robot, the handling of the person can be understood. It is possible to realize such control of releasing the grasp force as handing a thing from person over to person without strengthening the grasp force into crushing the object in the hand.

3. Third Exemplary Embodiment

Embodiment 3 is an embodiment that the robot grasp control apparatus of the invention is applied to the other than the human-type robot.

This embodiment is applicable to a robot in any form provided that it is a robot having, as a constituent element, a grasp unit 113 as described in embodiments 1 and 2. For example, application is possible for a human-type robot having two arms and two legs and an arm-type robot comprising an arm and a hand only. Furthermore, application is possible for an animal-type robot without limiting to the human type.

Figure 9:
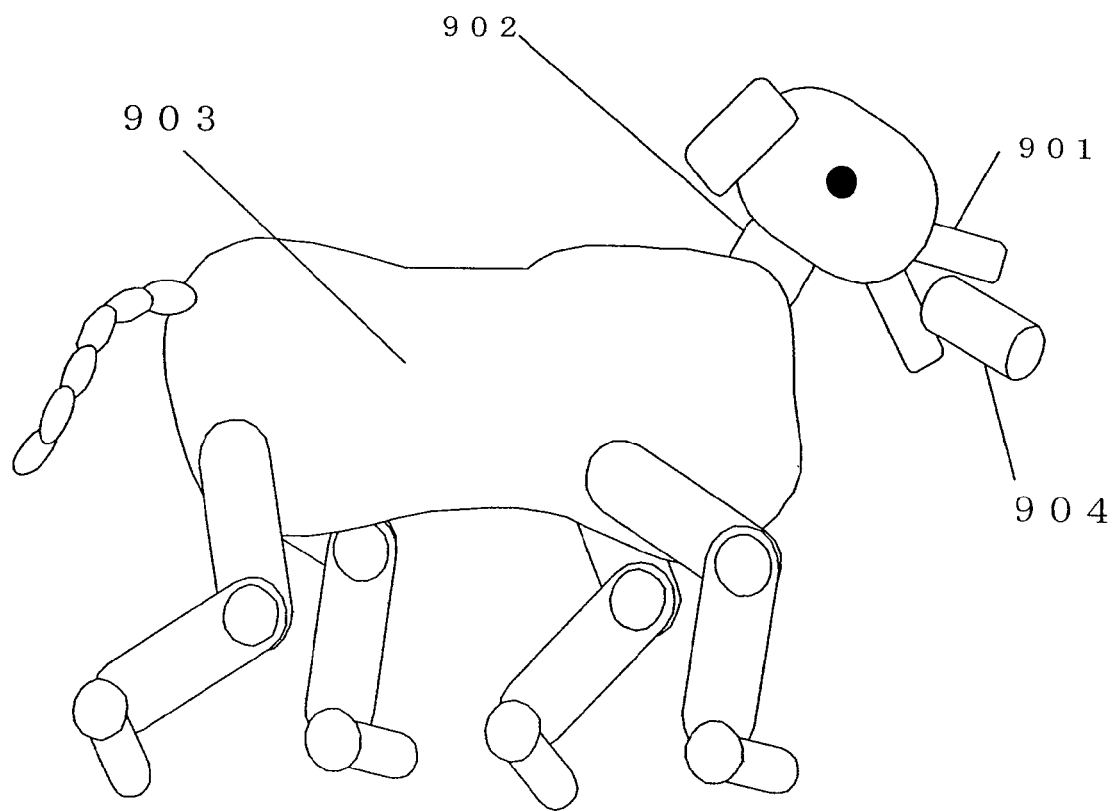
FIG. 9 is a side view showing a structure of an apparatus for robot handling control according to embodiment 3 of the invention.

FIG. 9 shows the application to an animal-type robot having neither a hand nor an arm. An end effecter 901, for holding an object 904, corresponds to the mouth of the animal-type robot 903. A robot arm 902, for moving the end effecter 901, corresponds to the neck of the animal-type robot 903.

Incidentally, although not shown in FIG. 9, the robot arm 902 is provided with an arm control section 111 and a joint-angle sensor 112 similarly to the robot arm 101 of FIG. 1. The end effecter 901 is provided with a force sensor 103.

Likewise, although not shown in FIG. 9, the gravity compensating section 104, the sensor-value variate measuring section 105, the object-grasp determining section 106, the grasp-release determining section 107, the grasp-force control section 108, the release-instruction recognizing section 109 and the alarm unit 110 in FIG. 1 are arranged in a head or body of the animal-type robot 903.

The robot arm 902, the arm control section 111, the joint-angle sensor 112, the end effecter 901, the force sensor 103, the gravity compensating section 104, the sensor-value variate measuring section 105, the object-grasp determining section 106, the grasp-release determining section 107, the grasp-force control section 108, the release-instruction recognizing section 109 and the alarm unit 110 are similar in configuration and operation to those of Embodiments 1 and 2, and herein omitted of explanation.

What is claimed is:

1. A method for controlling robot handling comprising:
    a) determining a direction of an external force acting upon an object, the external force exclusive of a grasp force by a robot grasping the object;
    b) determining whether the direction of the external force corresponds to a first direction or to a second direction, said second direction being substantially downward;
    c) when the direction of the external force corresponds to the first direction, a) moving the robot in a direction different from the first direction of the external force and b) releasing the grasped object if a reactive external force is detected acting on the grasped object; and
    d) when the direction of the external force corresponds to the second direction, a) reducing the grasp force on the grasped object and b) strengthening the grasp force on the grasped object if a slippage of the grasped object is detected.

2. A method for controlling robot handling according to claim 1, wherein step c) includes:
    determining that a change in the external force is due to a request for releasing the grasped object when the change in the external force is equal to or greater than a predetermined threshold; and
    releasing the grasped object when the change in the external force is determined to be due to the request for releasing the grasped object;
    determining, after releasing the grasped object in the releasing step, that the change in the external force is due to 1) a first condition which is a delivery of the grasped object when a dynamic frictional force in a gravity direction caused by a downward movement of the grasped object is not detected or 2) a second condition which is a non-delivery of the grasped object when the dynamic frictional force in the gravity direction caused by the downward movement of the grasped object is detected.

3. A method for controlling robot handling according to claim 1, further including:
    a step that attention is called to an outside when a grasp-force relaxing signal for releasing the grasped object is outputted.

4. A method for controlling robot handling according to claim 1, wherein step c) includes:
    removing a force intentionally applied by the robot when the reactive external force is not detected acting on the grasped object.

5. A method for controlling robot handling according to claim 1, wherein step d) includes:
    continuing to reduce the grasp force on the grasped object if the slippage of the grasped object is not detected.

6. A method for controlling robot handling according to claim 1, wherein:
    a direction of the reactive external force corresponds to a direction opposite to the direction moved by the robot.

7. Apparatus for controlling robot handling, said apparatus comprising:
    a determination unit for:
        a) determining a direction of an external force acting upon an object, the external force exclusive of a grasp force by a robot grasping the object; and
        b) determining whether the direction of the external force corresponds to a first direction or to a second direction, said second direction being substantially downward;
    wherein when the direction of the external force corresponds to the first direction, a) moving the robot in a direction different from the first direction of the external force and b) releasing the grasped object if a reactive external force is detected acting on the grasped object; and
    wherein when the direction of the external force corresponds to the second direction, a) reducing the grasp force on the grasped object and b) strengthening the grasp force on the grasped object if a slippage of the grasped object is detected.

8. Apparatus for controlling robot handling according to claim 7, wherein said determining whether the direction of the external force corresponds to said first direction or to said second direction includes:

determining that a change in the external force is due to a request for releasing the grasped object when the change in the external force is equal to or greater than a predetermined threshold; and releasing the grasped object when the change in the external force is determined to be due to the request for releasing the grasped object;

determining, after releasing the grasped object in the releasing step, that the change in the external force is due to 1) a first condition which is a delivery of the grasped object when a dynamic frictional force in a gravity direction caused by a downward movement of the grasped object is not detected or 2) a second condition which is a non-delivery of the grasped object when the dynamic frictional force in the gravity direction caused by the downward movement of the grasped object is detected.

9. Apparatus for controlling robot handling according to claim 7, wherein said determination unit calls: attention to an outside when a grasp-force relaxing signal for releasing the grasped object is outputted.

10. Apparatus for controlling robot handling according to claim 7, wherein, when the direction of the external force corresponds to the first direction, a force intentionally applied by the robot is removed when the reactive external force is not detected acting on the grasped object.

11. Apparatus for controlling robot handling according to claim 7, wherein, when the direction of the external force corresponds to the second direction, the grasp force on the grasped object is continued to be reduced if the slippage of the grasped object is not detected.

12. Apparatus for controlling robot handling according to claim 7, wherein a direction of the reactive external force corresponds to a direction opposite to the direction moved by the robot.

* * * * *